US006807004B2

(12) United States Patent
Carver

(10) Patent No.: US 6,807,004 B2
(45) Date of Patent: Oct. 19, 2004

(54) POLARIZATION INDEPENDENT OPTICAL TAPS

(75) Inventor: Gary E. Carver, Raritan Township, Hunterdon County, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 77 days.

(21) Appl. No.: 10/269,022

(22) Filed: Oct. 10, 2002

(65) Prior Publication Data

US 2004/0070830 A1 Apr. 15, 2004

(51) Int. Cl.[7] .............................. G02B 5/08; G02B 5/30
(52) U.S. Cl. ...................... 359/487; 359/585; 359/884
(58) Field of Search ................................ 359/483, 485, 359/487

(56) References Cited

U.S. PATENT DOCUMENTS

| 2,731,881 | A | * | 1/1956 | Kossel et al. ............... 359/487 |
| 3,893,749 | A | | 7/1975 | Ferray |
| 4,751,720 | A | * | 6/1988 | Koop ........................... 372/99 |
| 5,333,090 | A | | 7/1994 | Baumeister et al. |
| 5,608,521 | A | * | 3/1997 | De Long ..................... 356/326 |
| 5,864,425 | A | | 1/1999 | Filas |
| 6,002,822 | A | | 12/1999 | Strasser |
| 6,122,422 | A | | 9/2000 | Koeppen et al. |
| 6,385,369 | B1 | * | 5/2002 | Hill et al. ..................... 385/37 |

FOREIGN PATENT DOCUMENTS

| EP | 1 408 355 A1 | * | 4/2004 |
| GB | 1 362 181 A | | 7/1974 |
| JP | 06 331940 A | | 12/1994 |

OTHER PUBLICATIONS

F.C. Ho, and J.A. Dobrowolski, "Neutral and color–selective beam splitting assemblies with polarization–independent intensities", Applied Optics, vol. 31, No. 19, pp 3813–3820. Jul. 1, 1992.*
Patent Abstracts of Japan, vol. 1995, No. 03, Apr. 28, 1995.
European Search Report, 3 pages, Nov. 25, 2003.
T. Erdogan et al., "Tilted fiber phase gratings", *Journal of Optical Society of America*, A/vol. 13, No. 2, Feb. 1996, pp. 296–313.

* cited by examiner

Primary Examiner—John Juba, Jr.

(57) ABSTRACT

A unique reflective surface is employed to compensate polarization dependence of optical taps. Specifically, the reflective surface compensates optical tap induced polarization by employing the intrinsic properties of metals rather than complex thin film stacks. To this end, a reflective thin metal film or a polished reflective metal surface may be employed. In a particular embodiment of the invention, a reflective surface that is coated with a single dielectric thin film can also be employed. In one example, the metal is preferably tungsten because it exhibits a large difference in the spread of reflectance between the s and p polarization states.

19 Claims, 10 Drawing Sheets

SIMPLE REFLECTION SHOWING RAYS AND NORMAL WITHIN PLAN OF INCIDENCE

REFLECTANCE OF TYPICAL DIELECTRIC STACK

REFLECTANCE OF TYPICAL DIELECTRIC STACK

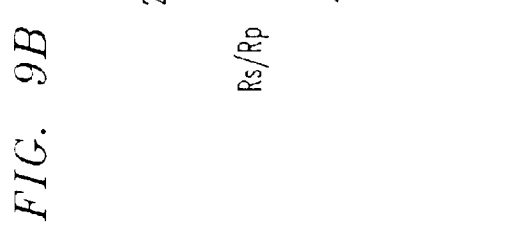
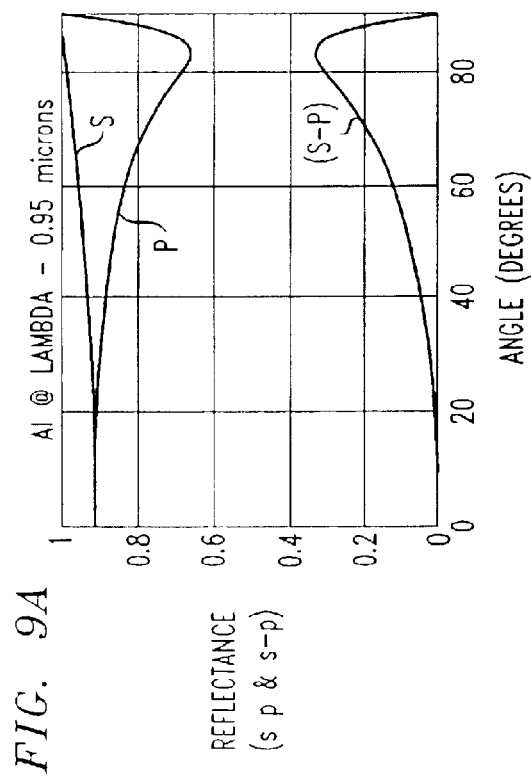
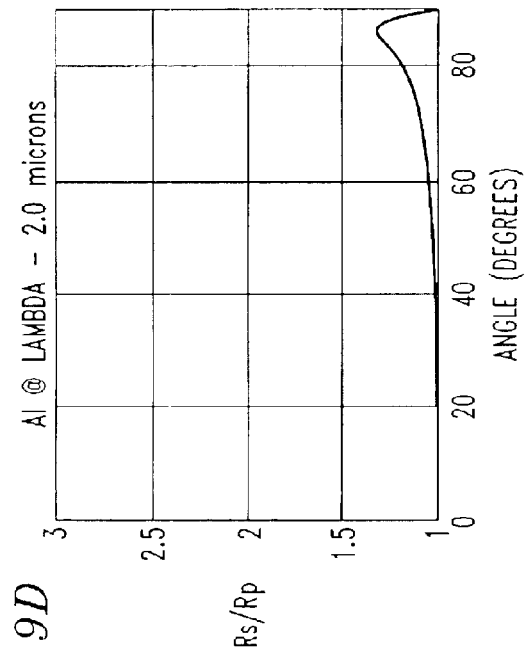
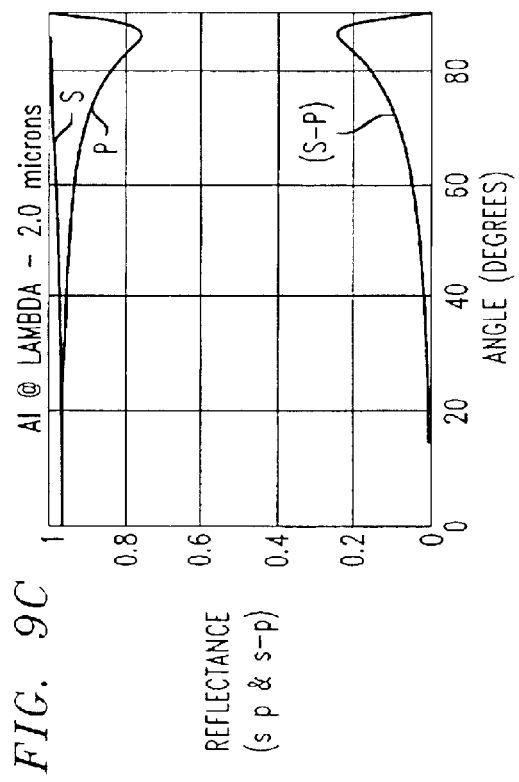
FIG. 9A
FIG. 9B
FIG. 9C
FIG. 9D

UNCOATED W AT 42 DEGREES

REFLECTANCE (s & p pol.)

UNCOATED W AT 42 DEGREES

RATIO OF s & p REFLECTANCE

UNCOATED W AT 45 DEGREES

REFLECTANCE (s & p pol.)

UNCOATED W AT 45 DEGREES

RATIO OF s & p REFLECTANCE

UNCOATED W AT
57 DEGREES

UNCOATED W AT
57 DEGREES

W COATED WITH
SILICON NITRIDE
AT 45 DEGREES

W COATED WITH
SILICON NITRIDE
AT 45 DEGREES

POLARIZATION INDEPENDENT OPTICAL TAPS

TECHNICAL FIELD

This invention relates to optical taps and, more particularly, to compensating polarization dependence of the optical taps.

BACKGROUND OF THE INVENTION

Optical taps are used to sample light from a fiber or beam, and can be based on fused couplers, blazed fiber Bragg gratings, waveguides, beam-splitters, and the like. Typically, these optical taps are polarization dependent. Since the state of polarization in a transmission fiber is unknown and can vary in time, this polarization dependence causes a power uncertainty of the sampled light beam.

An optical channel monitor (OCM) is a good example. The OCM samples optical signals from single mode fibers by diffracting light out of the fiber core into radiation modes via a blazed fiber Bragg grating. This diffraction process is stronger for s-polarized light than for p-polarized light. FIG. 1 shows a polarized beam 102 reflecting from surface 107 of a mirror 101. The plane of incidence 103 is defined as the plane that contains the incident and reflected beams 102 and 104, respectively, and is parallel to the surface of the paper. Plane of incidence 103 also contains normal 106 to surface 107 of mirror 101. The double headed arrows 105 depict p-polarized light where the electric field vector oscillates parallel to, i.e., within, the plane of incidence. The electric field vector of a s-polarized beam oscillates perpendicularly to the plane of incidence. The resulting power inaccuracy can be avoided by scrambling the incoming beam, by employing polarization diversity, or by passive compensation. Scrambling can be realized by varying the state of polarization in the temporal, spatial, or spectral domains. Scrambling is suited for laboratory applications and is typically not cost effective for applications such as channel monitoring. Polarization diversity involves routing the s and p polarization states through different optical paths such that the two states have equal insertion loss. This approach requires a complicated optical path that rarely fits in compact packages. Passive compensation utilizes an optical element that introduces polarization dependent loss (PDL) to undo the PDL of the tap.

The optical channel monitor uses passive compensation, wherein polarization induced power inaccuracy is avoided by reflecting the diffracted free space beam from a mirror. This mirror is positioned such that s-polarization at the grating becomes p-polarization at the mirror. To work effectively, the reflectance of this mirror must compensate grating PDL as a function of wavelength. This spectral dependence can be generated with complex dielectric thin film stacks. FIG. 2A plots the reflectance of the s and p polarization states near the high energy edge of a typical bandpass filter, FIG. 2B shows the ratio of the two curves of FIG. 2A. The ratio in FIG. B can is used to compensate polarization in the C-band. Since the sharp spectral transition is subject to manufacturing variations, the compensation is often imprecise.

SUMMARY OF THE INVENTION

These and other problems and limitations of the prior arrangements for attempting to compensate polarization dependence of optical taps are overcome by employing a unique reflective surface.

More specifically, applicant's invention is a reflective surface that compensates optical tap induced polarization by employing the intrinsic properties of metals rather than complex dielectric thin film stacks.

In one embodiment of the invention, a reflective surface is employed that is a prescribed metal film.

In another embodiment of the invention, a metal surface, polished or otherwise, is employed.

In one example, the metal is preferably tungsten because it exhibits a large difference in the spread of reflectance between the s and p polarization states.

In general, the spectral dependence and magnitude of the ratio of the reflectance (R) of the two polarization states s and p, namely, Rs/Rp, can be accurately matched by choosing amongst four degrees of freedom: selecting the correct metal; adjusting the angle at which the mirror or metal surface reflects a polarized light beam; adding a dielectric layer on top of the metal film; and/or using multiple mirrors or metal surfaces.

BRIEF DESCRIPTION OF THE DRAWINGS

FIG. 9A graphically shows reflectance (s, p) for an aluminum film at a first prescribed wavelength versus angle of incidence;

FIG. 9B graphically illustrates the ratio Rs/Rp of s and p polarizations versus angle of incidence for the aluminum film of FIG. 9A;

FIG. 9C graphically shows reflectance (s, p) for an aluminum film at a second prescribed wavelength versus angle of incidence;

FIG. 9D graphically illustrates the ratio Rs/Rp of s and p polarizations versus angle of incidence for the aluminum film of FIG. 9C;

DETAILED DESCRIPTION

Figure 1:
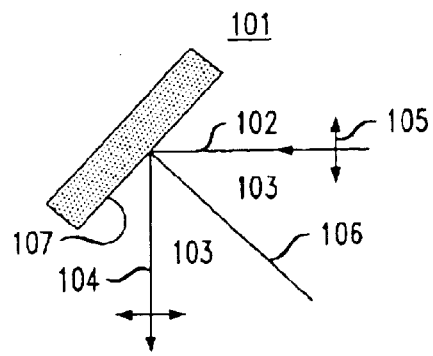
FIG. 1 shows a polarized beam reflecting from a mirror of a type known in the art.
Figure 2A:
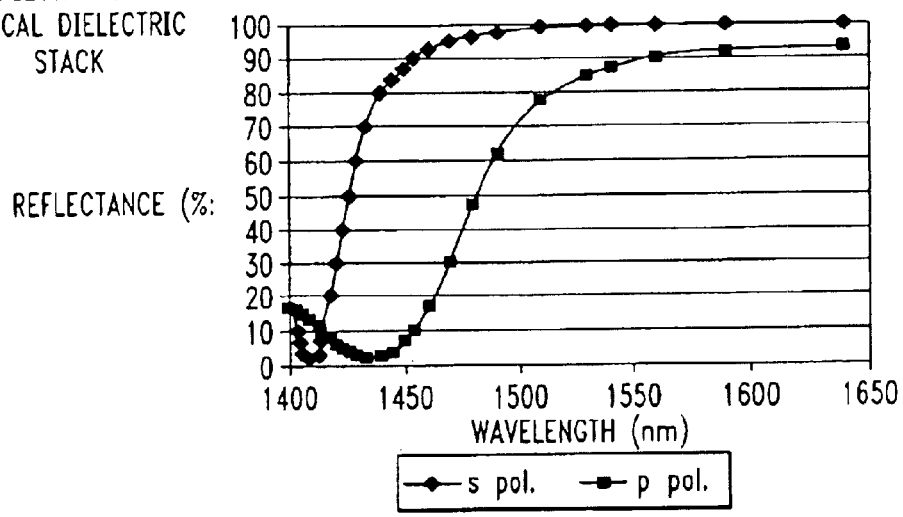
FIG. 2A graphically shows the reflectance versus wavelength for a typical known dielectric stack.
Figure 2B:
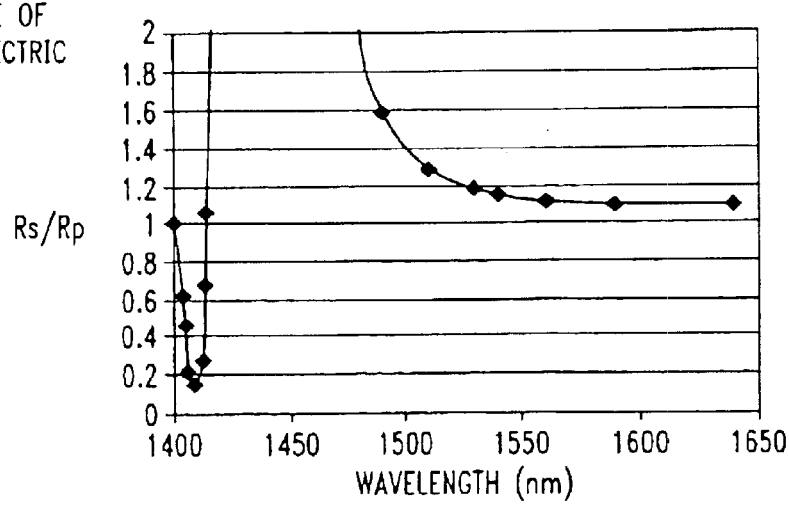
FIG. 2B graphically illustrates the ratio Rs/Rp of s and p polarizations versus wavelength for the dielectric stack of FIG. 2A.

FIGS. 3A, 3B, 3C and 3D show a Bragg grating 303 diffracting an incoming guided optical mode, i.e., beam, 302 within an optical fiber into a radiation mode in free space in an optical tap including an embodiment of the invention. Thus, as shown in the three-dimensional (X, Y and Z planes) depiction in FIG. 3A, incoming guided optical radiation 302, in this example, within an optical fiber, is directed to a blazed fiber Bragg grating 303 which diffracts it into optical radiation beam 304 in free space that is directed to reflective surface 301 having, in this example, a metalized film surface. As explained in more detail below, the metalized film surface of reflective surface 301 employs the intrinsic properties of metals rather than the prior known dielectric thin film stack to compensate for the polarization induced by grating 303. Further, note that double headed arrows 307 depict s-type polarization at grating 303 and in free space 304, i.e., electric field perpendicular to grating 303's plane of incidence. Since the reflective surface 301 reflects the free space beam out of the XZ plane along the Y direction as beam 305, the electric field is parallel to the plane of incidence at the reflective surface 301. As a result, s-polarization at the grating 303 becomes p-polarization at the reflective surface 301. Beam 305 is supplied to detector 306 for use as desired.

Figure 3A:
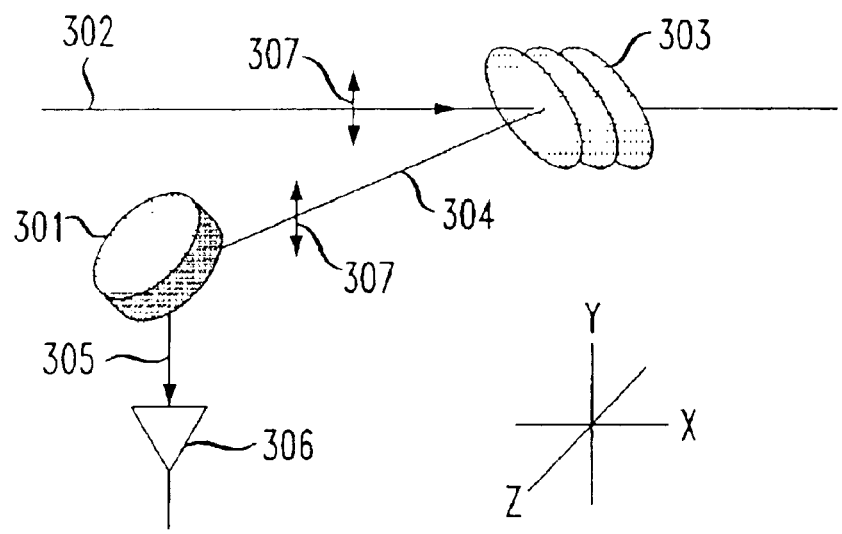
FIGS. 3A, 3B and 3C show a Bragg grating diffracting an incoming guided optical mode into a radiation mode in free space in an optical tap.
Figure 3B:
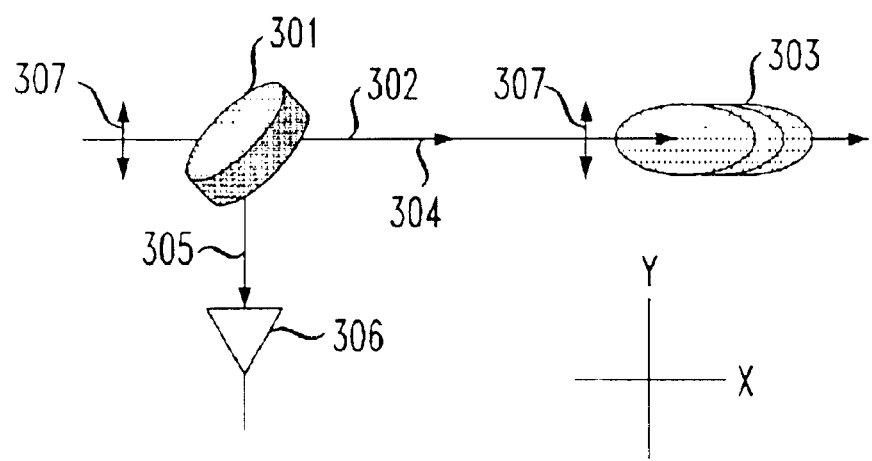

FIG. 3B shows the X–Y plane portion of the embodiment shown in FIG. 3A. The only visual difference is that diffracted beam 304 is overlaid on the depiction of incoming guide beam 302.

Figure 3C:
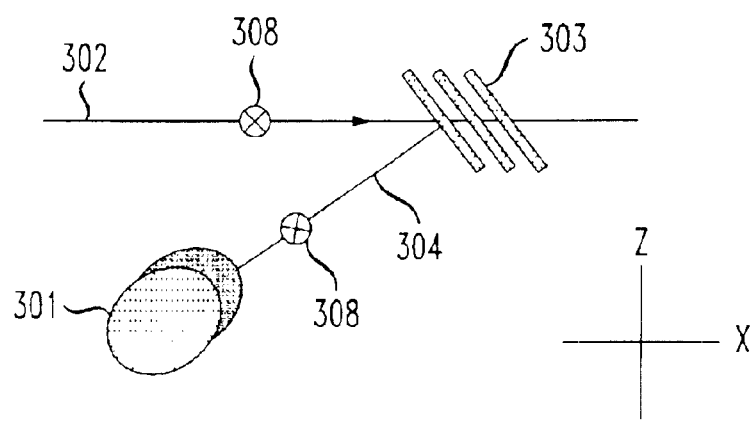

Similarly, FIG. 3C shows the X–Z plane portion of the embodiment of FIG. 3A. Here the circled X depicts s-polarization at and from grating 303. The only visual difference being the portion shown in FIG. 3C and the embodiment shown in FIG. 3A is that the refection of the diffracted beam from reflective surface 301 is hidden by reflective surface 301.

Figure 3D:
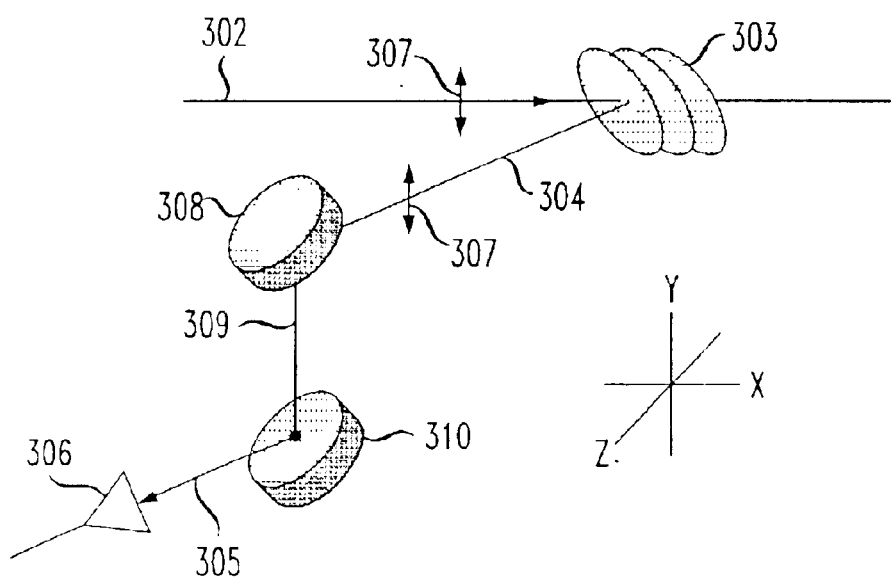
FIG. 3D shows a multiple reflective surface, i.e., mirror, implementation.

FIG. 3D shows an implementation similar to FIG. 3A except the reflective surface 301 of FIG. 3A is replaced by reflective surfaces 308 and 310, and light beam path 309. Thus as seen, multiple reflective surfaces 308 and 310 are used sequentially to adjust the magnitude and spectral tilt of Rs/Rp. As an example, the first reflective surface 308 is used to adjust the average Rs/Rp level and the second reflective surface 310 generates spectral tilt in Rs/Rp. This combination of two reflective surfaces 308 and 310 allows one reflective surface 308 to generate a relatively large but spectrally flat Rs/Rp, while the other reflective surface 310 generates a relatively small but spectrally tilted Rs/Rp.

Figure 4:
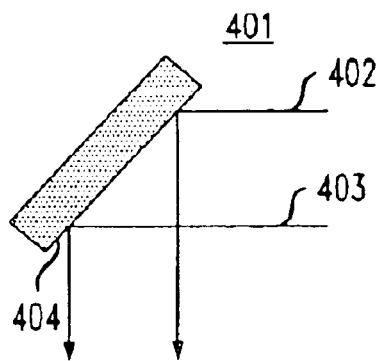
FIG. 4 shows a reflective surface, i.e., mirror, comprising a metal substrate, polished or otherwise, that may be employed in practicing the invention.

FIG. 4 shows a reflective surface, i.e., mirror, comprising a metal substrate 401, polished or otherwise, which may be employed in practicing the invention. After being diffracted by the grating (see FIG. 3) optical beams 402 and 403 propagate in free space and are then reflected from surface 404 of metal substrate 401.

Figure 5:
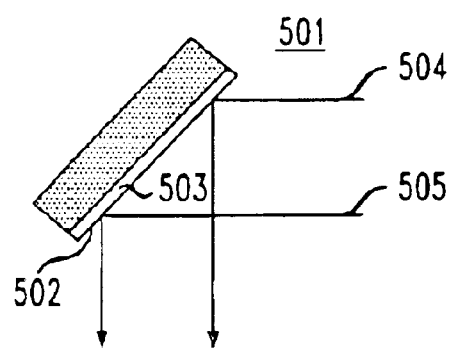
FIG. 5 shows a reflective surface, i.e., mirror, comprising a metal substrate of FIG. 4 coated with a dielectric layer that may be employed in practicing the invention.

FIG. 5 shows a reflective surface 501, i.e., mirror, comprising a metal substrate 401 of FIG. 4 coated with a dielectric layer 503 that may be employed in practicing the invention. Also shown are diffracted optical beams 504 and 505 in free space being reflected from the outer dielectric surface 502 of dielectric layer 503.

Figure 6:
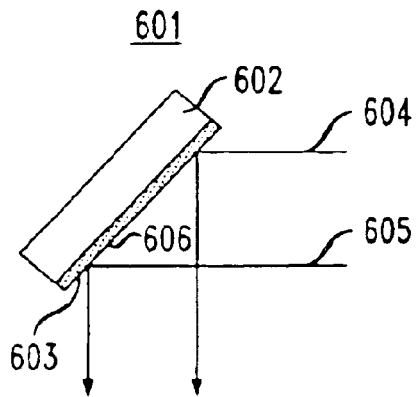
FIG. 6 shows a reflective surface, i.e., mirror, comprising a polished glass substrate coated with a prescribed thin metal film that may be employed in practicing the invention.

FIG. 6 shows a reflective surface, i.e., mirror, 601 comprising a glass substrate 602, polished or otherwise, coated with a prescribed thin metal film 603 that may be employed in practicing the invention. Also shown are diffracted optical beams 604 and 605 in free space being reflected from the outer metal film surface 606 of dielectric layer 603.

Figure 7:
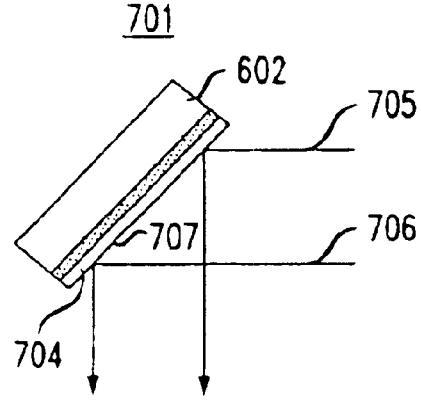
FIG. 7 shows the reflective surface of FIG. 6 coated with a dielectric layer that may be employed in practicing the invention.

FIG. 7 shows the reflective surface 701 including a glass substrate 601 polished or otherwise, and thin metal film 602 of FIG. 6 coated with a dielectric layer 704 that may be employed in practicing the invention. Also shown are diffracted optical beams 705 and 706 in free space being reflected from the outer dielectric surface 707 of dielectric layer 704.

Figure 8A:
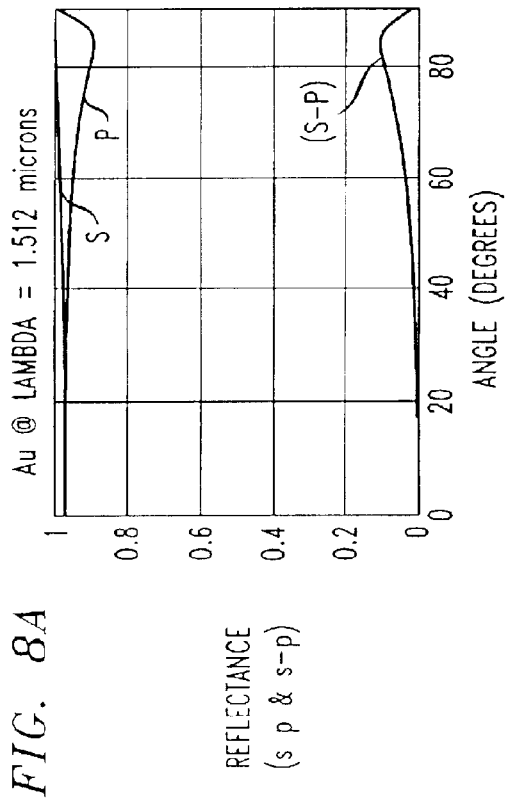
FIG. 8A graphically shows reflectance (s, p) for a gold film at a first prescribed wavelength versus angle of incidence.
Figure 8B:
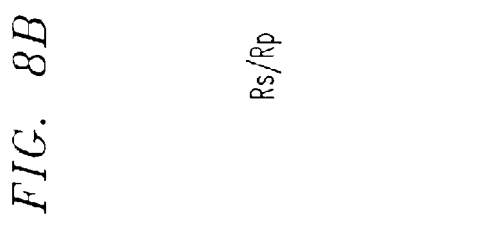
FIG. 8B graphically illustrates the ratio Rs/Rp of s and p polarizations versus angle of incidence for the gold film of FIG. 8A.
Figure 8C:
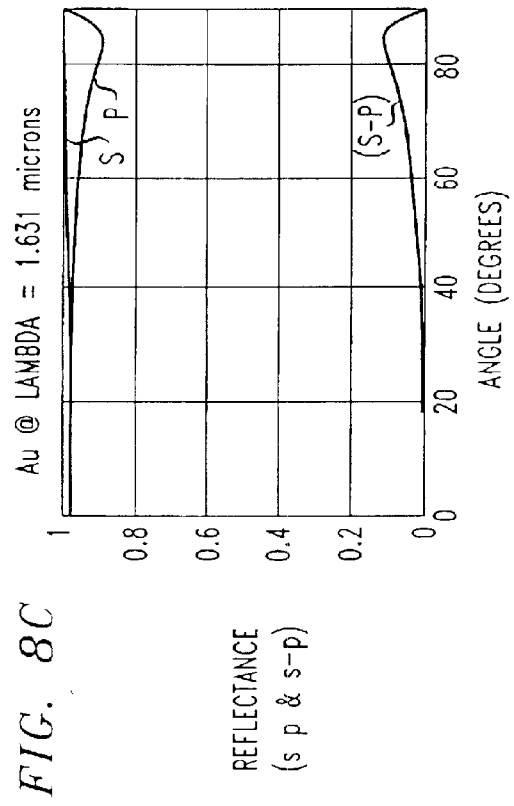
FIG. 8C graphically shows reflectance (s, p) for a gold film at a second prescribed wavelength versus angle of incidence.
Figure 8D:
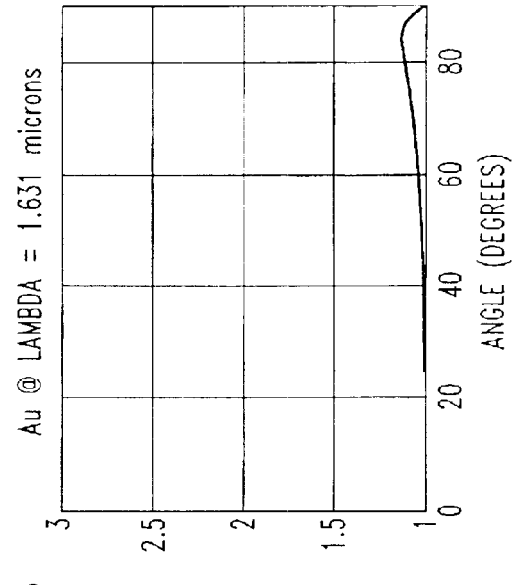
FIG. 8D graphically illustrates the ratio Rs/Rp of s and p polarizations versus angle of incidence for the gold film of FIG. 8C.
Figure 10B:
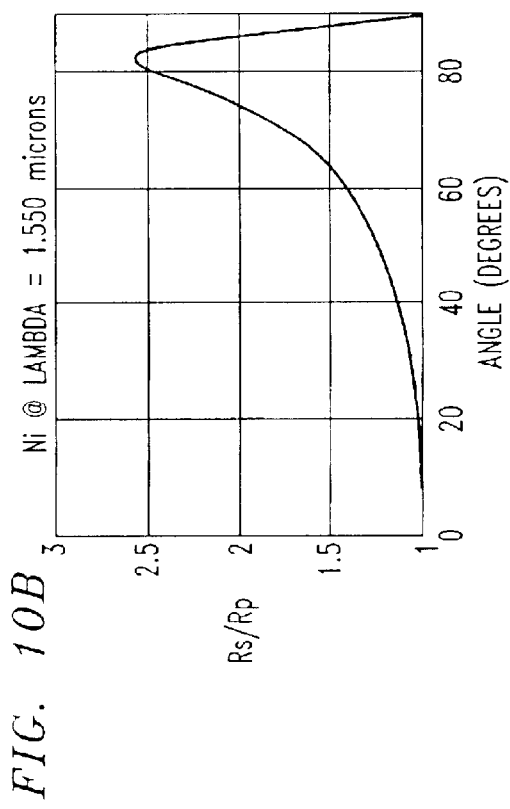
FIG. 10B graphically illustrates the ratio Rs/Rp of s and p polarizations versus angle of incidence for the nickel film of FIG. 10A.
Figure 10D:
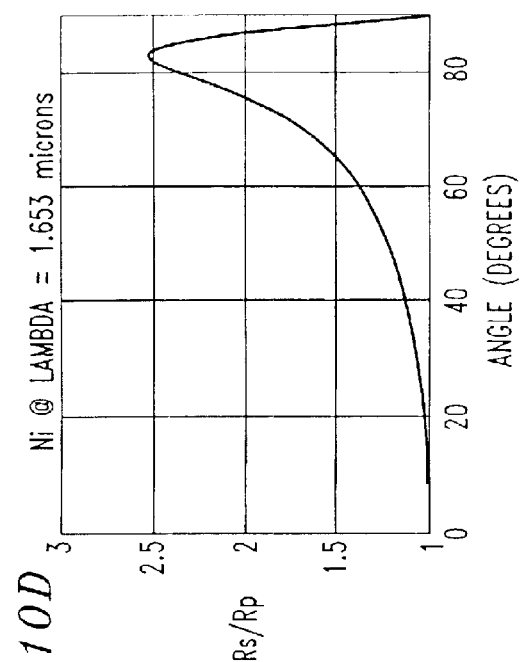
FIG. 10D graphically illustrates the ratio Rs/Rp of s and p polarizations versus angle of incidence for the nickel film of FIG. 10C.
Figure 10A:
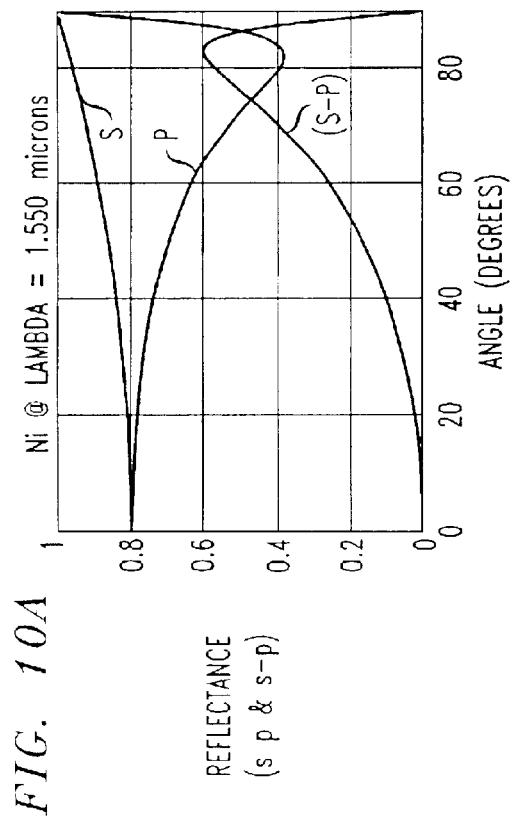
FIG. 10A graphically shows reflectance (s, p) for a nickel film at a first prescribed wavelength versus angle of incidence.
Figure 10C:
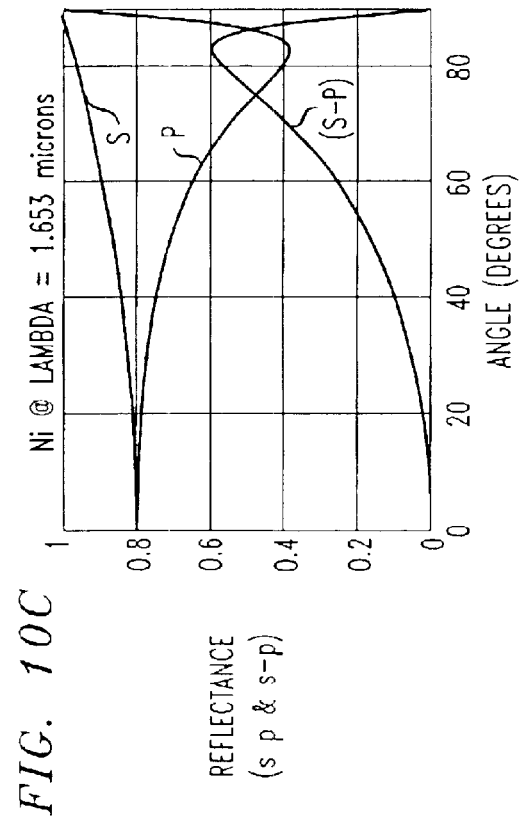
FIG. 10C graphically shows reflectance (s, p) for a nickel film at a second prescribed wavelength versus angle of incidence.
Figure 11B:
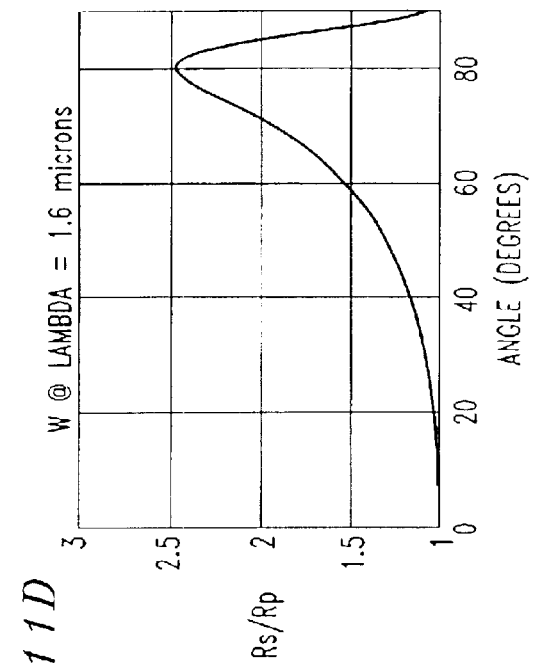
FIG. 11B graphically illustrates the ratio Rs/Rp of s and p polarizations versus angle of incidence for the tungsten film of FIG. 11A.
Figure 11D:
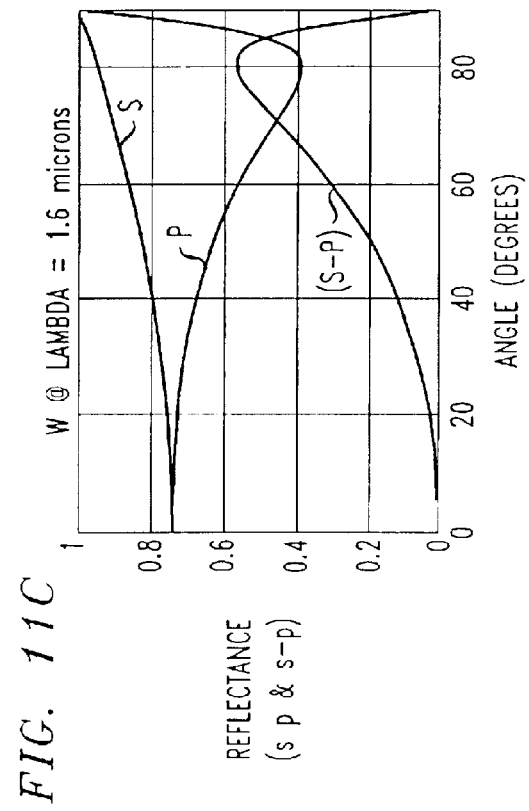
FIG. 11D graphically illustrates the ratio Rs/Rp of s and p polarizations versus angle of incidence for the tungsten film of FIG. 11C.
Figure 11A:
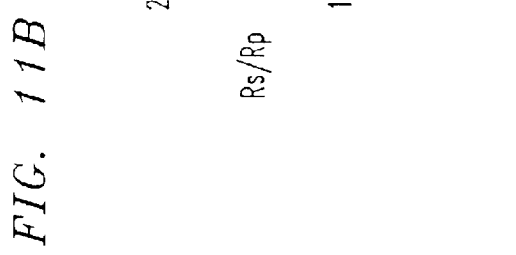
FIG. 11A graphically shows reflectance (s, p) for a tungsten film at a first prescribed wavelength versus angle of incidence.
Figure 11C:
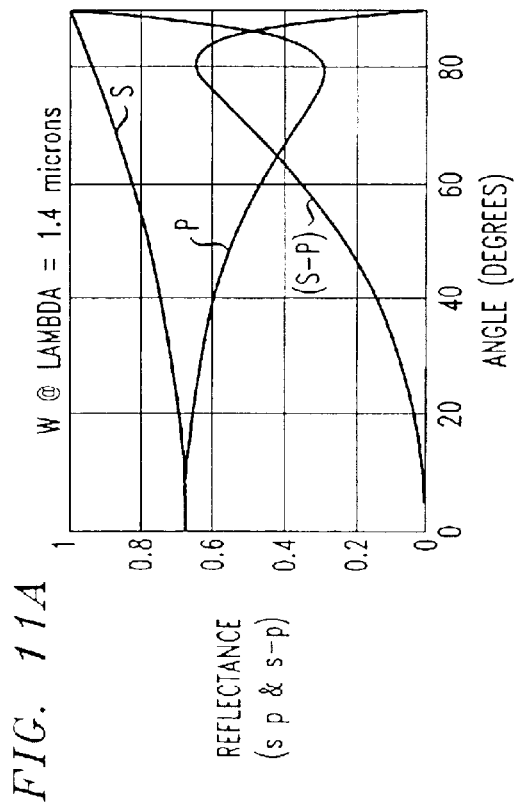
FIG. 11C graphically shows reflectance (s, p) for a tungsten film at a second prescribed wavelength versus angle of incidence.

As indicated above:

FIG. 8A graphically shows reflectance (s, p and s-p) for a gold film at a first prescribed wavelength versus angle of incidence;

FIG. 8B graphically illustrates the ratio Rs/Rp of s and p polarizations versus angle of incidence for the gold film of FIG. 8A;

FIG. 8C graphically shows reflectance (s, p and s-p) for a gold film at a second prescribed wavelength versus angle of incidence;

FIG. 8D graphically illustrates the ratio Rs/Rp of s and p polarizations versus angle of incidence for the gold film of FIG. 8C;

FIG. 9A graphically shows reflectance (s, p and s-p) for an aluminum film at a first prescribed wavelength versus angle of incidence;

FIG. 9B graphically illustrates the ratio Rs/Rp of s and p polarizations versus angle of incidence for the aluminum film of FIG. 9A;

FIG. 9C graphically shows reflectance (s, p and s-p) for an aluminum film at a second prescribed wavelength versus angle of incidence;

FIG. 9D graphically illustrates the ratio Rs/Rp of s and p polarizations versus angle of incidence for the aluminum film of FIG. 9C;

FIG. 10A graphically shows reflectance (s, p and s-p) for a nickel film at a first prescribed wavelength versus angle of incidence;

FIG. 10B graphically illustrates the ratio Rs/Rp of s and p polarizations versus blaze angle for the nickel film of FIG. 10A;

FIG. 10C graphically shows reflectance (s, p and s-p) for a nickel film at a second prescribed wavelength versus angle of incidence;

FIG. 10D graphically illustrates the ratio Rs/Rp of s and p polarizations versus angle of incidence for the nickel film of FIG. 10C;

FIG. 11A graphically shows reflectance (s, p and s-p) for a nickel film at a first prescribed wavelength versus angle of incidence;

FIG. 11B graphically illustrates the ratio Rs/Rp of s and p polarizations versus angle of incidence for the nickel film of FIG. 11A;

FIG. 11C graphically shows reflectance (s, p and s-p) for a nickel film at a second prescribed wavelength versus angle of incidence;

FIG. 11D graphically illustrates the ratio Rs/Rp of s and p polarizations versus angle of incidence for the nickel film of FIG. 11C.

As shown in FIGS. 8A through 11D, metals such as nickel and tungsten reflect s-polarized light much more strongly than p-polarized light. In contrast, the noble metals (copper, silver, and gold) reflect the two polarizations with nearly equal intensity while aluminum is an intermediate case. This is due to the relative size of the real and imaginary parts of the index of refraction (n). As an example, gold's n=0.609+i10.3 and tungsten's n=1.97+i5.27 at 1630 nm. The relative size of the real and imaginary parts of the index of refraction is influenced by a competition between free and bound electrons. The imaginary index is high in metals dominated by free electrons, while the real and imaginary parts have roughly similar values in metals influenced by interband transitions (see the *Handbook of Optical Constants of Solids by E. D. Palik, Academic Press,* 1985). The above comments apply to bulk metals, for example, as shown in FIG. 4, and thin metal films deposited on smooth glass substrates, for example, as shown in FIG. 6.

Note that the thin metal film should have a thickness such that it is opaque to the wavelengths of interest. For example for a metal like tungsten, the thin metal film should have a thickness of about 1000 to 2000 Angstroms. When used, the dielectric layer should have a thickness substantially equal to the wavelengths of interest.

The films can be deposited on a substrate by standard techniques such as evaporation, sputtering, or chemical vapor deposition. The macroscopic dimensions of the reflective surface should be large enough to encompass the entire optical light beam at a desired angle of incidence.

Figure 12A:
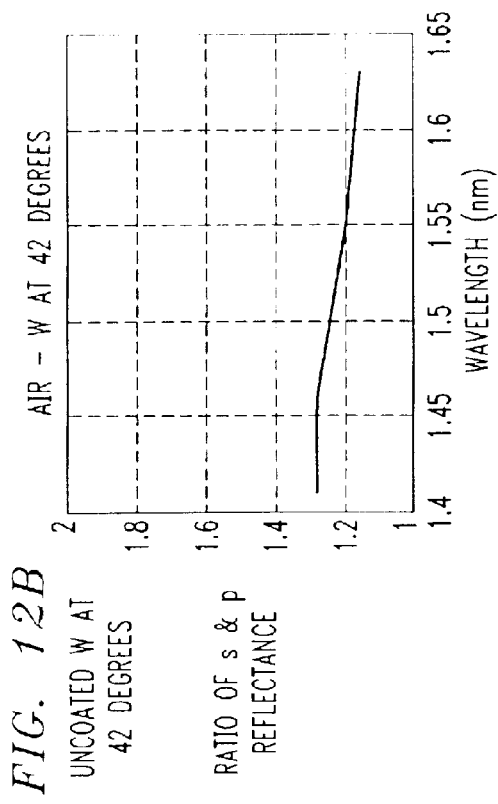
FIG. 12A graphically shows reflectance (s, p) for tungsten versus wavelength at a first prescribed angle of incidence.

FIG. 12A graphically shows reflectance (s, p) for tungsten versus wavelength at a first prescribed angle of incidence.

Figure 12B:
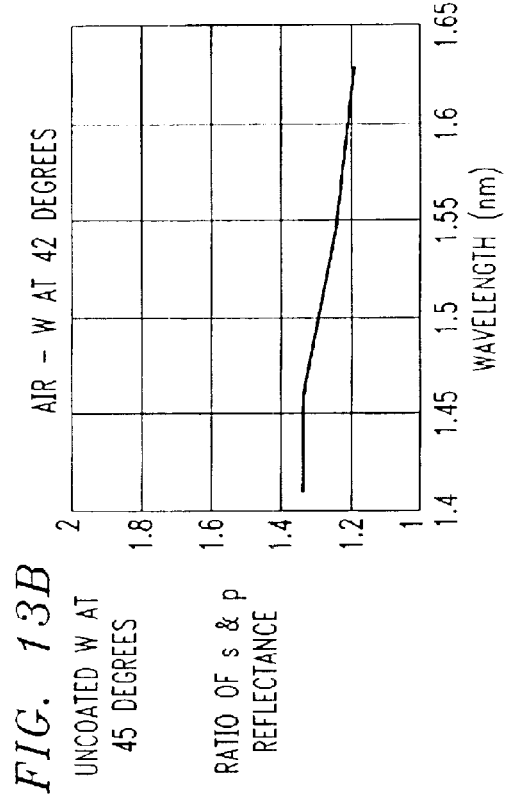
FIG. 12B graphically illustrates the ratio Rs/Rp of s and p polarizations versus wavelength at the first prescribed angle of incidence for tungsten.

FIG. 12B graphically illustrates the ratio Rs/Rp of s and p polarizations versus wavelength at the first prescribed angle of incidence for tungsten.

Figure 13A:
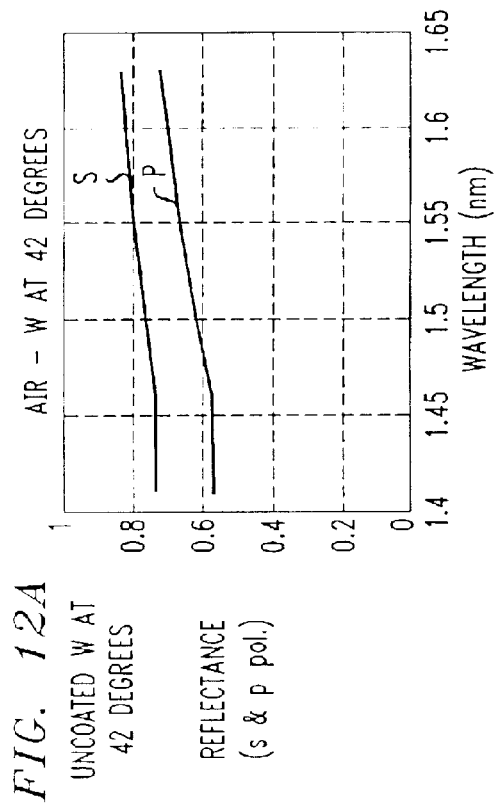
FIG. 13A graphically shows reflectance (s, p) for tungsten versus wavelength at a second prescribed angle of incidence.

FIG. 13A graphically shows reflectance (s, p) for tungsten versus wavelength at a second prescribed angle of incidence.

Figure 13B:
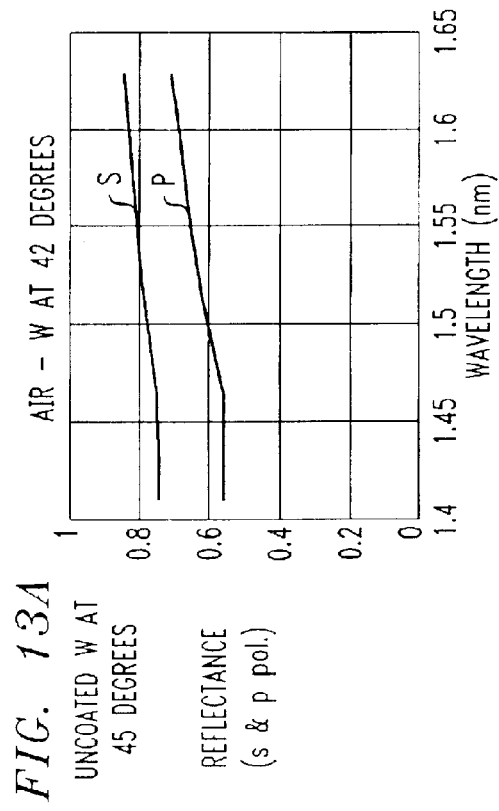
FIG. 13B graphically illustrates the ratio Rs/Rp of s and p polarizations versus wavelength at the second prescribed angle of incidence for tungsten.

FIG. 13B graphically illustrates the ratio Rs/Rp of s and p polarizations versus wavelength at the second prescribed angle of incidence for tungsten.

Figure 14A:
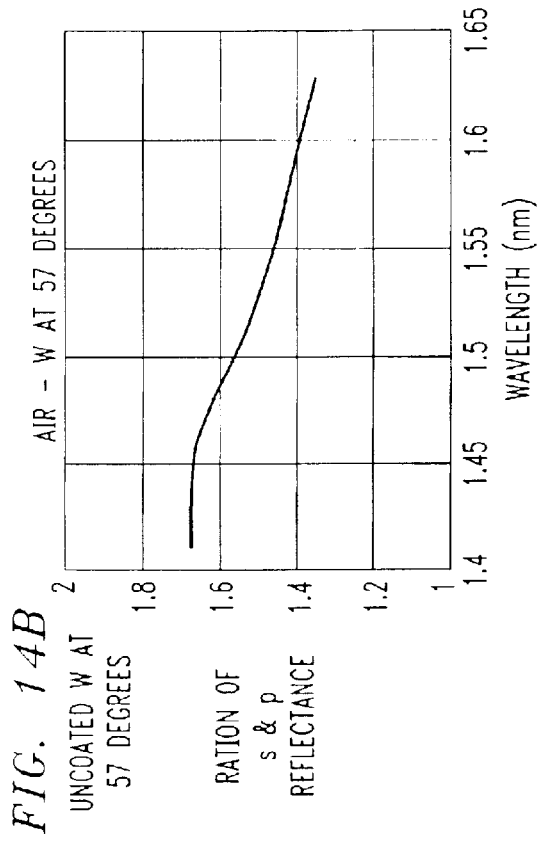
FIG. 14A graphically shows reflectance (s, p) for tungsten versus wavelength at a third prescribed angle of incidence.

FIG. 14A graphically shows reflectance (s, p) for tungsten versus wavelength at a third prescribed angle of incidence.

Figure 14B:
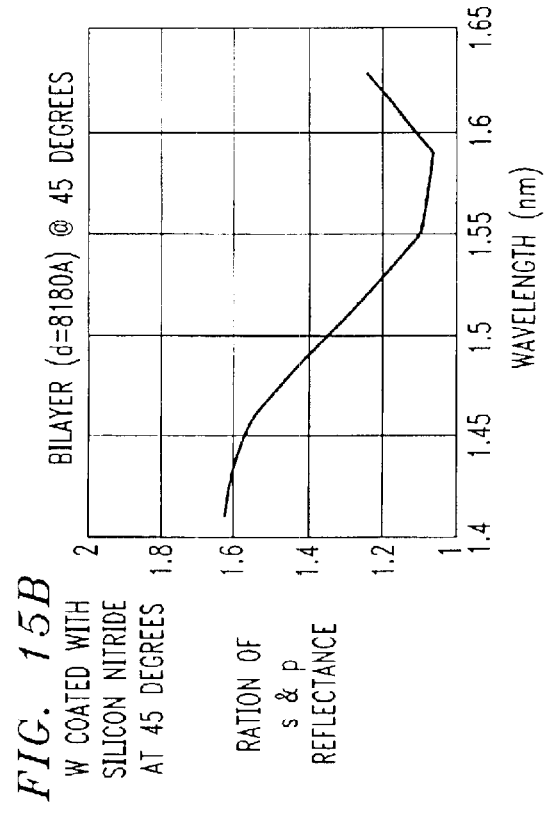
FIG. 14B graphically illustrates the ratio Rs/Rp of s and p polarizations versus wavelength at the third prescribed angle of incidence for tungsten.

FIG. 14B graphically illustrates the ratio Rs/Rp of s and p polarizations versus wavelength at the third prescribed angle of incidence for tungsten.

As shown in FIGS. 12, 13, and 14, the angle of incidence can also be used to adjust the magnitude of the Rs/Rp ratio for a given metal.

Figure 15A:
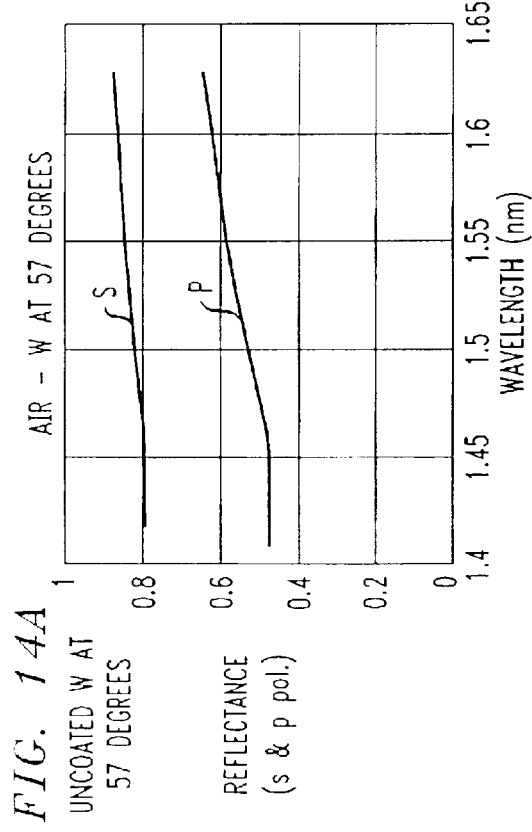
FIG. 15A graphically shows reflectance (s, p) for tungsten coated with a prescribed dielectric layer versus wavelength at the second prescribed angle of incidence.
Figure 15B:
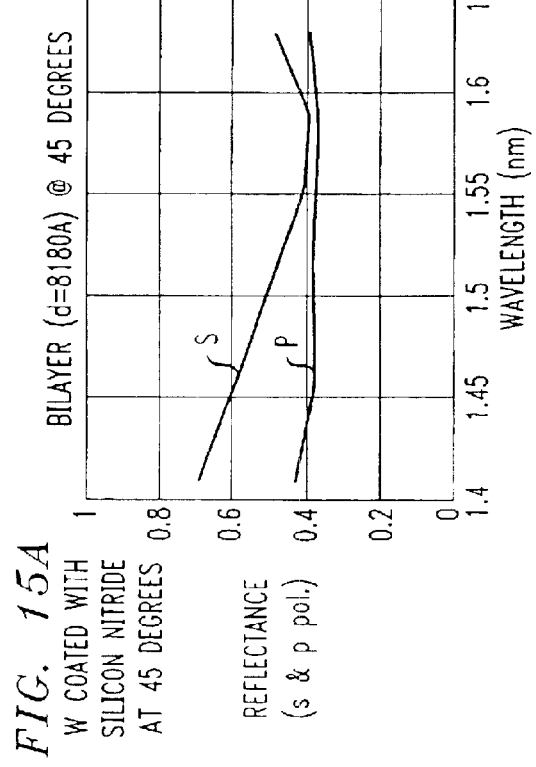
FIG. 15B graphically illustrates the ratio Rs/Rp of s and p polarizations versus wavelength at the second prescribed angle of incidence for tungsten coated with a prescribed with a dielectric layer.

In addition, the Rs/Rp ratio of a metal can be modified by a dielectric coating, see for example, FIGS. 5 and 7. If a few thousand Angstroms of silicon nitride are deposited on a metal surface, light reflects from both the air/dielectric and dielectric/metal interfaces. The interference of these reflections can be used to optimize the spectral distribution of the Rs/Rp ratio, see for example, FIGS. 15A & 15B.

Since different wavelengths are diffracted from the grating 303 (FIG. 3) at different angles, grating induced polarization dependent loss (PDL) is a function of wavelength (for example—the ratio of the reflectance of the two polarizations, Rs/Rp, can vary from about 1.24 to 1.08 across the C-band). The spectral dependence and magnitude of Rs/Rp can be accurately matched by choosing amongst four degrees of freedom: selecting the correct metal, adjusting the angle at which the mirror surface reflects the polarized light beam, adding a dielectric layer on top of the metal film, and/or using multiple reflective surfaces.

A tungsten coated mirror surface can nearly match a typical grating's Rs/Rp as a function of wavelength. Other transition metals (such as Ni, Mo, V (vanadium), Fe, Ta), and transition metal compounds (such as TiC, TiN) generate a range of Rs/Rp ratios. Metallic alloys could also be used to adjust Rs/Rp for a given application. Metals with reflectance that range from moderate to high values over the spectral band of interest provide more spectral tilt in Rs/Rp. As shown in FIGS. 8A–11D, the angle of incidence at the reflective surface (angle between the normal 106 and incoming beam 102 in FIG. 1) can also be changed to alter Rs/Rp. FIGS. 12A and 12B, 13A and 13B, and 14A and 14B show reflectance s and p and Rs/Rp versus wavelength for tungsten (W) at 42, 45, and 57 degrees of incidence, respectively. As seen in the FIGs., changing the angle of incidence mostly adjusts Rs/Rp up and down without changing the spectral tilt. For a C-band grating, FIG. 15B demonstrates a desirable Rs/Rp spectral dependence by using a tungsten reflective surface that has been coated with about 8000A of silicon nitride. Other coatings such as silicon dioxide and silicon can also be used. These types of bilayers have demonstrated impressive stability in other applications (photothermal solar conversion). Finally, multiple reflective surfaces can also be used sequentially to adjust the magnitude and spectral tilt of Rs/Rp.

This reflective surface embodiment of the invention compensates the polarization of blazed fiber Bragg gratings such that the PDL of optical channel monitors (OCMs) and other optical taps can be held below, for example, 0.2 db. Since metal films only need to be opaque, deposition conditions are easy to control. In contrast, complex dielectric stacks under current use employ a sharp spectral edge to generate the desired Rs/Rp ratio. This sharp edge is difficult to control. The metal films therefore provide a more robust method for PDL compensation. Further, large PDL values from gratings blazed at high angles can also be compensated with proper designs. Finally, channel monitors with dual grating designs (an additional challenge due to the need for complex Rs/Rp spectral shapes) can be suitably compensated with metallic reflective surfaces.

Further, this inventive compensation technique will be useful in channel monitors that employ free space gratings rather than fiber gratings.

The above-described embodiments are, of course, merely illustrative of the principles of the invention. Indeed, numerous other methods or apparatus may be devised by those skilled in the art without departing from the spirit and scope of the invention.

What is claimed is:

1. A prescribed reflective surface for use in an optical tap comprising:
   an optical path to direct a tapped portion of a light beam onto said prescribed reflective surface; and
   said prescribed reflective surface including the use of intrinsic properties of at least one predetermined transition metallic element to compensate for polarization induced in said optical tap.

2. The apparatus as defined in claim 1 wherein said reflective surface includes a mirror surface comprised of a predetermined transition metallic element film.

3. The apparatus as defined in claim 2 wherein said predetermined transition metallic element film has a thickness that is sufficient to be opaque to light wavelengths of interest.

4. The apparatus as defined in claim 2 wherein said predetermined transition metallic element film is coated with a prescribed dielectric material.

5. The apparatus as defined in claim 4 wherein said dielectric material has a thickness related to the light wavelengths of interest.

6. The apparatus as defined in claim 1 wherein said prescribed reflective surface is a predetermined transition metallic element.

7. The apparatus as defined in claim 6 wherein said predetermined transition metallic element is coated with a predetermined dielectric material.

8. The apparatus as defined in claim 1 wherein said prescribed reflective surface is a predetermined substrate coated with a predetermined transition metallic element film and said transition metallic element film is coated with a predetermined dielectric material.

9. The apparatus as defined in claim 1 wherein said at least one predetermined transition metallic element is present within said mirror as a transition metal compound.

10. The apparatus as defined in claim 1 wherein said at least one predetermined transition metallic element is present within said mirror as an alloy of transition metals.

11. The apparatus as defined in claim 1 wherein an angle of incidence of the light beam at said reflective surface is adjustable.

12. The apparatus as defined in claim 1 wherein said at least one transition metallic element is tungsten.

13. The apparatus as defined in claim 1 wherein said at least one transition metallic element is vanadium.

14. A prescribed reflective surface employed in an optical tap comprising:
    said prescribed reflective surface including first and second reflective surfaces each of which includes the use of intrinsic properties of at least one predetermined transition metallic element to compensate for polarization induced in said optical tap;
    an optical path to direct a tapped portion of a supplied light beam onto said first reflective surface; and
    said second reflective surface being arranged to reflect said supplied light beam reflected from said first reflective surface, wherein a light beam reflected from said second reflective surface is said supplied light beam, which has been compensated to be a polarization independent light beam.

15. The apparatus as defined in claim 14 wherein said first reflective surface is arranged to adjust an average Rs/Rp magnitude level and said second reflective surface is arranged to generate a spectral tilt in Rs/Rp, where Rs is reflectance of s-polarized light and Rp is reflectance of p-polarized light.

16. The apparatus as defined in claim 15 wherein said first reflective surface generates a relatively large but spectrally flat Rs/Rp and said second reflective surface generates a relatively small but spectrally tilted Rs/Rp.

17. The apparatus as defined in claim 14 wherein said prescribed reflective surface includes a mirror surface comprised of a predetermined transition metallic element film.

18. The apparatus as defined in claim 17 wherein said metal film has a thickness that is sufficient to be opaque to light wavelengths of interest.

19. The apparatus as defined in claim 17 wherein said transition metallic element film is coated with a predetermined dielectric material.

* * * * *